Figure 6:
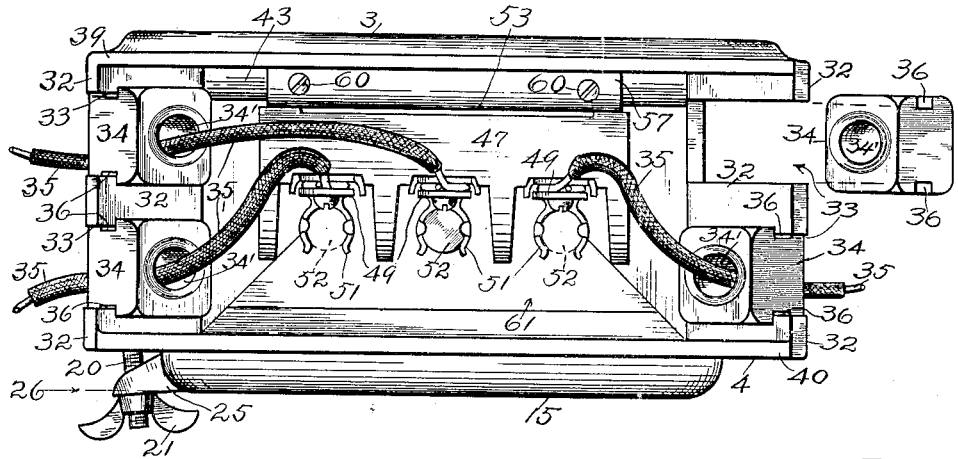

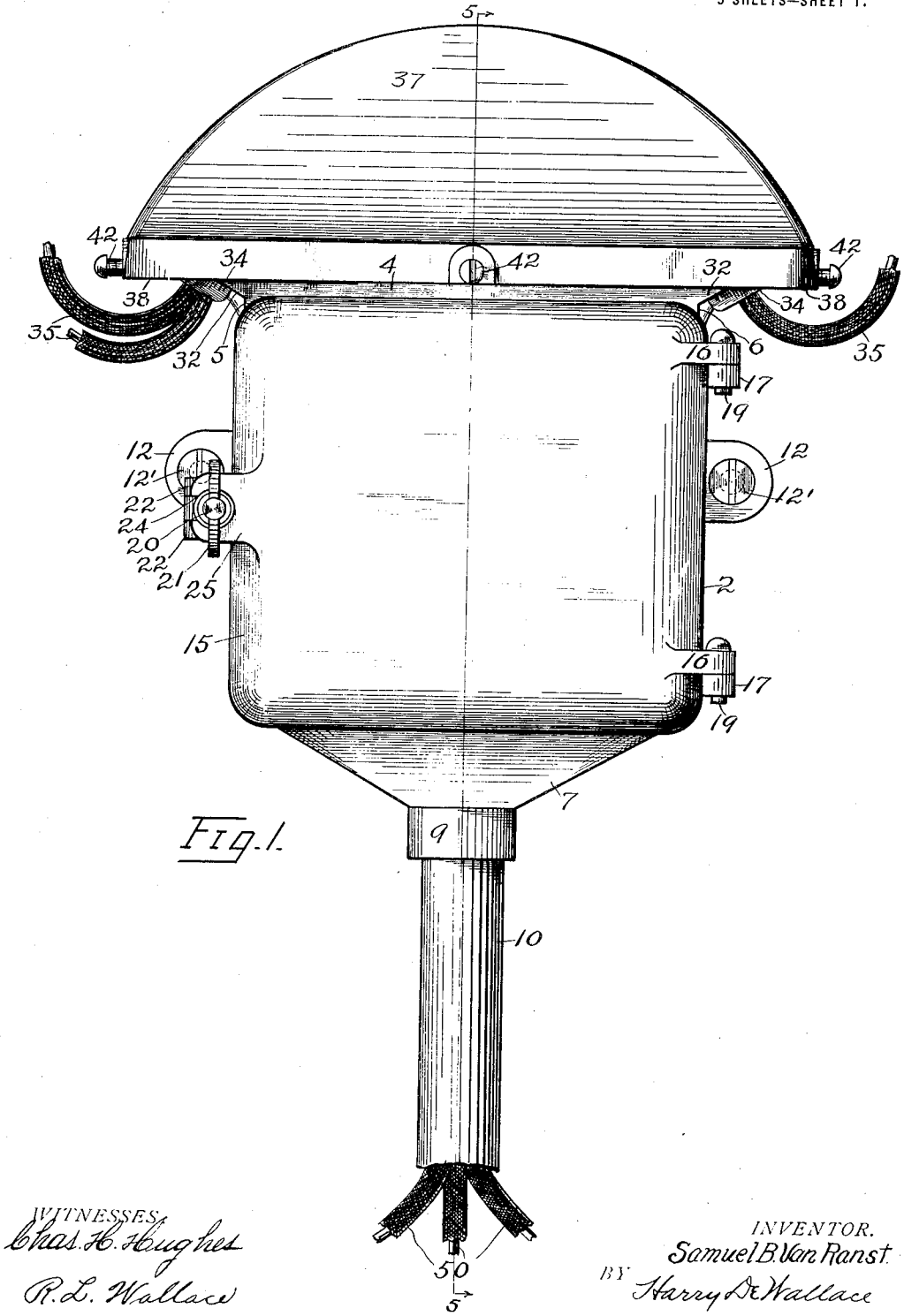

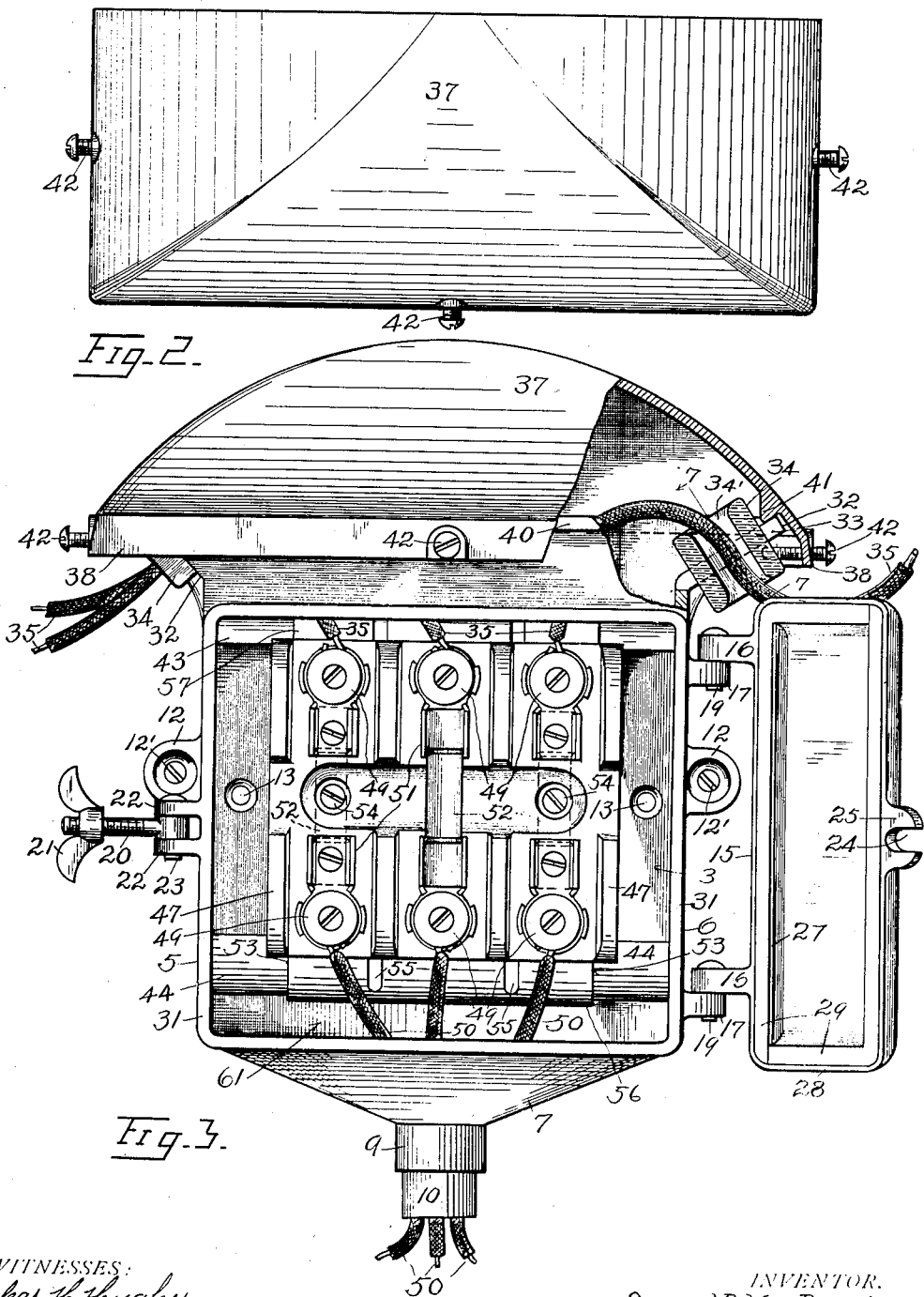

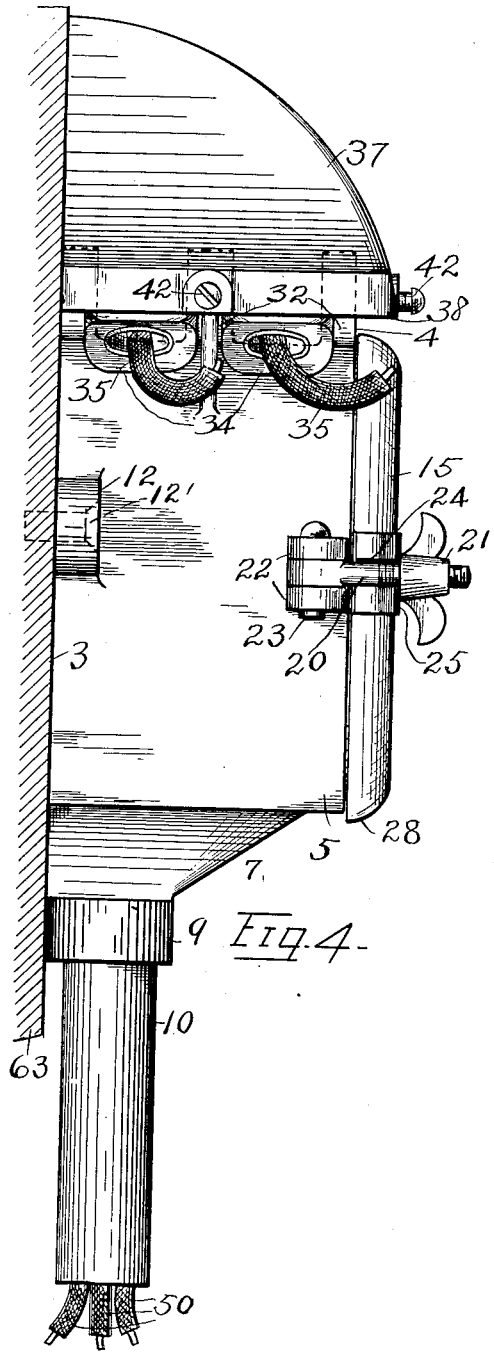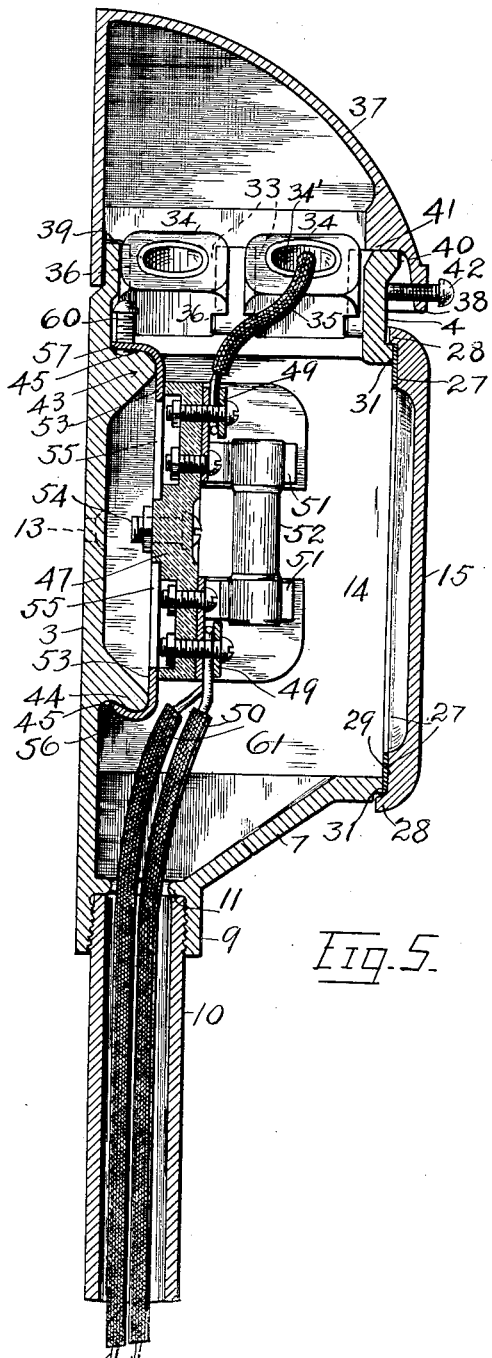

S. B. VAN RANST.
ELECTRIC CONDUIT FITTING.
APPLICATION FILED FEB. 11, 1910.

1,243,902.

Patented Oct. 23, 1917.
5 SHEETS—SHEET 4.

WITNESSES:
Chas. H. Hughes
R. L. Wallace

INVENTOR.
Samuel B. Van Ranst
BY Harry D. Wallace
ATTORNEY.

S. B. VAN RANST.
ELECTRIC CONDUIT FITTING.
APPLICATION FILED FEB. 11, 1910.

1,243,902.

Patented Oct. 23, 1917.
5 SHEETS—SHEET 5.

WITNESSES
Chas. H. Hughes.
R. L. Wallace

INVENTOR.
Samuel B. Van Ranst
BY Harry D. Wallace
ATTORNEY.

UNITED STATES PATENT OFFICE.

SAMUEL B. VAN RANST, OF SYRACUSE, NEW YORK, ASSIGNOR TO CROUSE-HINDS COMPANY, OF SYRACUSE, NEW YORK, A CORPORATION OF NEW YORK.

ELECTRIC-CONDUIT FITTING.

1,243,902.  Specification of Letters Patent.  Patented Oct. 23, 1917.

Application filed February 11, 1910. Serial No. 543,292.

*To all whom it may concern:*

Be it known that I, SAMUEL B. VAN RANST, a citizen of the United States, residing at Syracuse, in the county of Onondaga and State of New York, have invented certain new and useful Improvements in Electric-Conduit Fittings, of which the following is a specification.

This invention relates to electric fittings, designed for use for housing fuse cut-outs, and the invention relates particularly to a service entrance fitting for use in connection with electric conduits.

Heretofore it has been the custom for electric power plants, as central stations, to furnish power to the general public by means of heavy mains or trunk lines, which distribute the electric current over a large territory. At intervals, these mains are tapped for supplying current at a reduced voltage to branch mains or conductors, which carry the same into buildings and other like places for local use. As a general rule, at the point where the branch lines receive the energy from the mains, a transformer is employed for reducing the voltage suitably for the local installations. Frequently, a number of independent branch service lines are fed from the one transformer, for serving as many different consumers or circuits, and these are usually protected by so-called primary fuses carried by the transformer. Where several service lines are supplied with current by one transformer, in case of a ground or short circuit in any one of the service lines, if no intermediate or secondary protection is provided, the primary fuses of the transformer might be blown, in which event, all of the branch lines fed by the transformer would be interrupted until the defective line could be located, disconnected, and the main fuses of the transformer replaced. It not infrequently happens that the blowing of the primary fuses results in more serious trouble than the mere interruption of the service during the interval required for the replacing of the said fuses. In many instances a ground or a short circuit occurring between the transformer and the protective devices or terminals located within a building, fuses or melts the service wires and these become welded in the conduits—sometimes burning through and destroying the conduit—thus rendering it impossible to withdraw the service wires, or otherwise restore the service, without reconstructing the conduits. To this end it is an object of the present invention to provide a secondary or intermediate protective device, to be interposed between the transformer and the service conduit pipe carried by a building, for obviating the troubles referred to, and particularly for localizing certain forms of the said troubles.

The said device consists of a substantial weatherproof fitting, arranged for connecting with the conduit pipe, and also arranged for receiving the branch mains or service wires direct from the transformer. The said fitting is further arranged to receive and support a fuse cut-out, or a number of such cut-outs, of different styles or makes, each of which may be adjustably mounted upon specially constructed supports, arranged with novel and simple securing means. The said fitting is further arranged for suitably insulating all of the electric wires and connections, and for preventing the abrasion of the wires, as well as, short circuits. The said fitting is constructed and arranged to shed water falling upon it, and to prevent moisture and dirt from entering, or in any manner endangering the electric parts inclosed with said fitting.

A particular object of the invention is to provide means for installing within the said fitting protective cut-outs for each of the service entrance wires, and to arrange the said cut-outs in such manner that either one of them may be blown-out, by reason of a short circuit or ground occurring in the branch mains between the transformer and the conduit, due to over-load or otherwise, without in any way affecting or disturbing the other service wires, thus localizing all trouble and avoiding interruption of the service to other consumers or lines, which may be fed from the same transformer. And a further object is to provide a fuse inclosing fitting, which will eliminate fire risk, as well as, expense of repairing and replacing service conduit installations.

The invention will be more fully understood from the detail description which follows, and by reference to the accompanying drawings which form a part of this specification, and in which—

Figure 1 is a front elevation, showing the complete fitting applied to a conduit, also showing branch service wires in place. Fig.

Figure 7:
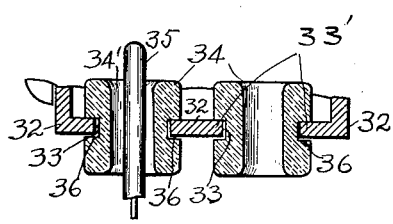
Figure 8:
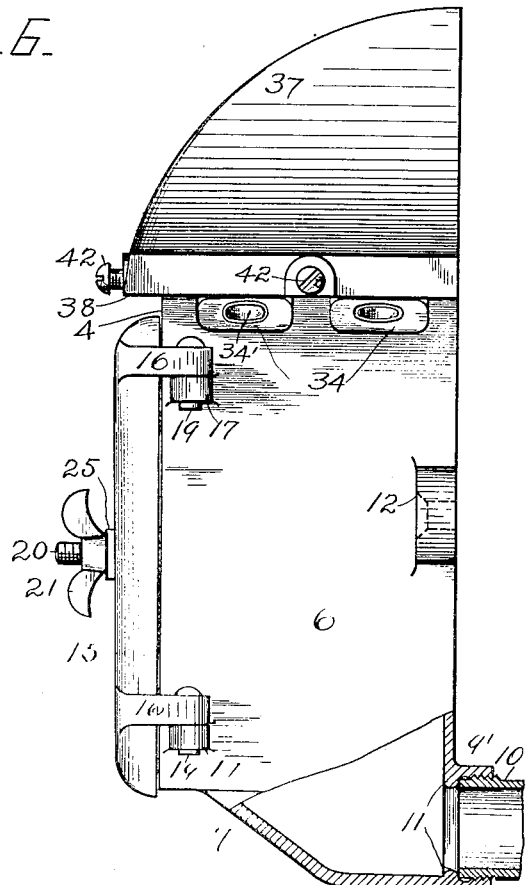
Figure 9:
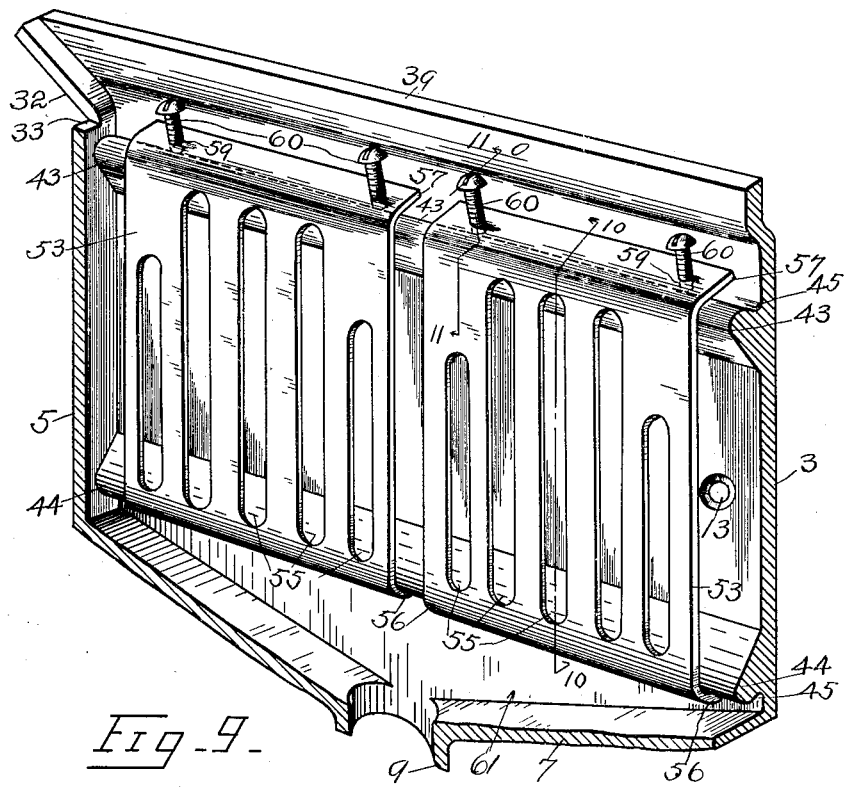
Figure 10:
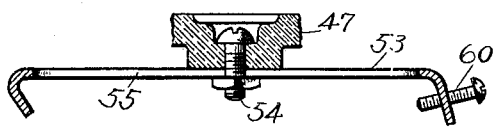
Figure 11:
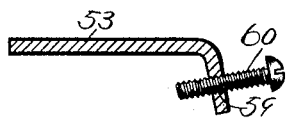

2 is a top plan view of the same. Fig. 3 is a front view with the door open, showing location of fuses, a portion of the cap broken away for showing the arrangement of the bushings for the wires. Fig. 4 is a side elevation. Fig. 5 is a central vertical section on line 5—5 of Fig. 1. Fig. 6 is a top plan view of fitting with cap removed. Fig. 7 is a sectional view on line 7—7 of Fig. 3, showing the bushings for the wires and manner of applying and supporting same. Fig. 8 is a side elevation, showing modified arrangement of the conduit receiving nipple. Fig. 9 is a perspective view, showing the method of mounting and attaching the fuse supporting plates to the integral ribs on rear inner wall of fitting. Fig. 10 is a sectional detail of the fuse supporting plate, taken on line 10—10 of Fig. 9, showing the manner of attaching the fuse block to the plate. Fig. 11 is a sectional detail, on line 11—11 of Fig. 9, showing arrangement of the plate securing means.

My improved fitting consists of a hollow casing 2 preferably made of cast metal, comprising a back 3, front 4, sides 5 and 6, and a depressed angular-shaped bottom 7. The bottom of the casing preferably inclines and converges rearwardly, and terminates in a central depending cylindrical neck 9, arranged flush with the back 3, which is apertured and threaded to form a nipple to receive or to connect with a conduit pipe 10. The neck 9 at the inner end of the nipple-threads is preferably choked by an annular rib 11, which is provided for an abutment or stop for the inner end of pipe 10. The rib also serves to prevent the wires from contacting with any bur or sharp edge on the end of the pipe.

At each side of the back is arranged an integral laterally projecting lug 12 perforated to receive screws 12' or other suitable devices, for attaching the fitting to a building, pole or other support convenient to a transformer. The back 3 is also perforated, as at 13, for providing additional means for securing the casing in service position.

The front wall 4 of the casing is arranged with a large opening 14, for permitting access to the interior, for installing and operating the appliance and connections inclosed therein. The opening 14 is closed by a door or cover 15, which is hinged to the side 6 by means of perforated lugs 16, 16 carried by the door, and by similar lugs 17, 17, which project from the side wall of the casing, and pivot pins 19, which pierce the said lugs. The cover 15 is arranged so that when open it may be swung laterally clear of the opening, as shown in Fig. 3, and when closed, it is held in such position, by a hinge-bolt 20, and a wing-nut 21, the bolt being pivoted between lugs 22 carried by side 5 of the casing, by a pin 23. The bolt 20 is pivoted to the casing in such manner that it may be swung laterally toward and from the edge of the door, and when swung into locking position passes into a laterally facing slot 24, arranged in a lug 25, which is formed on and projects beyond the left side edge of the door. The arrangement of the bolt and wing-nut is such that when the latter is unscrewed sufficiently the bolt may be swung into the slot 24, and then the nut screwed inwardly against the lug 25 until it forces and holds the door in closed position. The lug 25 is arranged at an angle relatively to the plane of the door, as shown at 26 in Fig. 6, for preventing the accidental releasing of the bolt and wing-nut and the opening of the door. The inner side of the door is provided with a depressed surface or ledge 27, surrounded by a continuous flange 28, for receiving a packing or gasket 29, preferably rubber, which may be connected to the door by cement or other securing means. The gasket 29 is arranged to seat against a continuous outwardly facing rib 31 formed on the front wall of the casing bordering the opening 14 and which is overlapped by the flange 28 when the door is closed. The entire border or outer edge of the door is curved or rounded, as shown, to shed water and also to relieve the part of sharp corners and edges.

The upper end of the casing is flared at its opposite sides to provide laterally projecting angular portions 32, which preferably extend upwardly and appear level with the top edge of the front and back of the casing. The flaring portions or walls 32 of the casing are each provided with a number of outwardly facing slots or openings 33, arranged between parallel guide-arms or guide-lugs 33', for receiving insulating bushings 34 having holes 34' for the wires 35, the bushings being provided with oppositely arranged coacting grooves 36 for engaging the parallel edges of the slots. Owing to the slots formed in the flaring walls and to the grooves 36 in the bushings which receive the margins of the arms 33', the arrangement of the slots 33 is such that the bushings 34 are held partly by gravity from being displaced or detached from the slots.

37 represents an arched cover of cap for closing the upper end of the casing. The cover is hollow and arranged with a continuous depending lip or flange 38, which over-laps and shields the entire top of the casing, including the flared portions 32 and the bushings 34. The upper part of the back 3, as 39, is cast or arranged forward of the underlying part of such back, in order to receive the depending rear wall of the cover, thus making the rear surface of the casing and cover flush. The upper front part 4 of the casing is provided with a overhanging edge or rib 40 for strengthening the said wall. The interior of the front and end walls of the cover or hood 37 is provided with a horizontally arranged depressed shoulder or ledge 41, which bears upon the top of the front 4 of the casing and also upon the tops of the flaring portions 32 of the sides 5 and 6 thus affording a firm and level support for the cover. The cover is held in place on the casing by a series of screws 42 which pass through threaded perforations in the depending flange 38, the inner ends of the screws engaging the front wall 4 beneath the rib 40 and also the angular portions 32 in a manner to prevent the displacement of the cover. This feature may best be seen by reference to Figs. 3 and 5. Externally the cover 37 is arranged to shed water falling upon the fitting and to prevent the same from entering the open top. The cover is also arranged to protect the bushings 34 from moisture, and at the same time prevent withdrawal of the bushings from the slots 33 as the cover closes the upper ends of the slots through which the bushings are removable.

The casing 2 is intended for receiving and inclosing fuse or other suitable cut-outs to be used in connection with service entrance wires, and preferably interposed between a transformer (not shown) and a conduit pipe arranged within, or upon the outside of a building. To provide in a simple and convenient manner for the installing of the cut-outs, a number of integral transversely disposed ribs, as 43 and 44, are formed or mounted on the inner wall of the back 3 of the casing, and these extend substantially the full width of the interior or chamber of the casing. Ribs 43 and 44 are arranged with grooves 45 facing respectively the top and bottom of the casing.

47 represents a fuse or cut-out base, preferably consisting of an insulating material, as porcelain, or fiber, which is fitted with the usual binding contacts 49, for wires, as 35 and 50, and clips 51 for fuse cut-outs, as 52. Any other form of cut-outs, such as open-link or plug fuses (not shown) may also be used instead of the inclosed type of fuses, as shown. The fuse-block 47 is mounted upon a supporting plate or part 53, and secured thereto by screws or bolts 54, which pass through perforations in the block and then through slots or openings 55 formed in the said plate. The number and arrangement of the slots 55 are such that fuse-blocks of different sizes and makes may be readily attached to the plate. To mount the plate 53 within the casing 2, the opposite ends of the plates are bent, to provide coacting lugs or flanges 56 and 57 for over-lapping and engaging the ribs 43 and 44. The lower end 56 of the plate 53 is bent inwardly in a manner to form a flange-hook to grip the overhanging edge of rib 44, and the upper end 57 of the said plate is bent substantially at right angles to the plane of the plate and is perforated and threaded, at 59, to receive screws 60 which are driven through the flange 57 and engage the bottom of the groove in rib 43, as best seen in Figs. 5 and 9. Under this construction and arrangement of the flanged-plate 53 and the ribs 43 and 44, by the tightening up or loosening of the screws 60, the plates, with fuses mounted thereon, may be readily, quickly and securely attached to, or removed from, the inner wall of the fitting, and they may also be adjusted to different positions to suit the requirements of the installation, as well as, the character or style of the parts. The ribs 43 and 44 are arranged so as to hold the body of the slotted plates 53 free and clear of the metallic sides and back of the casing and thus provide for the ready and safe attaching of the cut-out bases.

The bottom of the casing is arranged with a space 61 contiguous to the nipple for permitting free manipulation of the wires 50, particularly the connecting of the said wires to the fuse block.

The conduit nipple 9 is arranged at the lower side of the casing substantially flush with back 3 of the main fitting to facilitate mounting both the fitting and the conduit upon a flush wall, as 63.

In the smaller fittings of this class but one fuse-block supporting-plate 53 is employed, as illustrated in Figs. 3, 5 and 6. In the larger fittings, such as used in connection with heavier installations, for supplying a number of consumers, two or more plates 53 are usually mounted upon the ribs 43—44, as illustrated in Fig. 9. In either case, the arrangement of the slots 55 is such that a number of cut-out blocks or bases may be adjustably mounted upon each plate. The fuse blocks should be mounted upon and securely attached to the plates before the latter are inserted in the fitting. The threading of the screws 60 into the flange 57 of the plate 53 and the driving of the said screws into the groove 45, as illustrated in Fig. 9, tend to draw the lower flange-hook 56 tightly against the under side of rib 43, and owing to the peculiar form and arrangement of these parts, there is no danger of the plates becoming loose or detached while in service position.

The fitting herein shown and described is arranged for three wire service, but a smaller or a greater number of wires for supplying one or more circuits may be employed without requiring any material alteration or change of the principal parts of the device. By enlarging the casing and providing a greater number of bushings, a series of independent service wires may be run through the fitting, and each may be provided with an independent fuse or cut-out of any suitable make or size mounted upon one or more suporting plates, for safe-guarding the electric fittings, instruments or protective devices located within a building or other place.

The location of my fitting at a convenient point between the transformer and the local installations, and the novel and simple arrangement of the cut-out mechanisms and the supports therefor, for protecting the service installations and locaziling all trouble from grounds and short circuits, together with the provision of the means for making the fitting weather and water-proof, and the simple and ready manner in which the device and all of the appliances and fittings carried by it may be installed, interchanged and operated, constitute the essential features of my invention.

Having thus described my invention, what I claim as new and desire to secure by Letters Patent, is—

1. A fitting including two parts, one a body having projections on the inner face of a wall thereof, and the other a support for an electrical appliance having projections for lapping the projections of the body, and means extending through one of the projections of one of said parts and engaging the contiguous projection of the other of said parts, substantially as and for the purpose specified.

2. A fitting comprising a hollow body having substantially parallel projections on the inner face of a wall thereof, and a support for an electrical appliance carried by the projections, said support having engaging portions shaped to form means for coacting with said projections, one of the projections having its outer face undercut and the engaging portion of the support coacting with said projections being shaped to substantially conform to said undercut side of the projections, and clamping means associated with the other of the engaging portions of the support and coacting with the other projection, substantially as and for the purpose specified.

3. A fitting comprising a hollow body having a plurality of ribs on the inner face of a wall thereof, and a support for an electrical appliance carried by the ribs, said support having portions thereof shaped to form hooks for coacting with said ribs, one of the hooks having means associated therewith for holding the support with the hooks engaged with the ribs, substantially as and for the purpose set forth.

4. A fitting comprising a hollow body having a plurality of substantially horizontal parallel ribs on the vertical face of a wall thereof, and a support for an electrical appliance carried by the ribs, said support having portions thereof shaped to form hooks for coacting with said ribs whereby the support is supported by the ribs, and means for holding the support with the hooks engaged with the ribs, said means extending through one of said hook shaped portions into engagement with the corresponding rib, substantially as and for the purpose described.

5. A fitting comprising a hollow body having a plurality of ribs on the inner face of a wall thereof, and a support for an electrical appliance carried by the ribs, said support having hook shaped means for coacting with said ribs, one of the ribs having its outer face undercut and the hook shaped means of the support coacting therewith being bent to conform to said undercut face, and means extending through the other hook shaped means of the support into coaction with the corresponding rib, substantially as and for the purpose specified.

6. A conduit fitting comprising a hollow body formed with a pair of substantially parallel ribs grooved on their outer sides, and a supporting member for an electrical appliance carried by the ribs, said member being provided with means coacting with the grooved sides of the ribs for holding said member in position, substantially as and for the purpose set forth.

7. A conduit fitting comprising a hollow body formed with a pair of substantially parallel ribs grooved on their outer sides, and a supporting member for an electrical appliance carried by the ribs, said member being provided with means coacting with the grooved sides of the ribs for holding said member in position, the means associated with one of the hook shaped means being movable for permitting the detachment and attachment of the support, substantially as and for the purpose described.

8. A conduit fitting comprising a hollow body having a plurality of oppositely grooved ribs provided on the inner face of a wall thereof, and a support for an electrical appliance mounted upon and overlapping said ribs, and extending into and slidably interlocking into the grooves thereof, substantially as and for the purpose specified.

9. A conduit fitting comprising a hollow body open at its top and having a bottom formed with means for connection with a conduit, one of the walls of the body having a wire passage near its upper edge, said passage opening through the upper edge of the body, a support having an electrical appliance mounted within the body, a cap lapping the upper edge of the body and extending across the upper portion of the wire passage where said passage opens through the upper edge of the body, the cap having an overhanging portion forming eaves, under and near which the wire passage is located, substantially as and for the purpose described.

10. A conduit fitting comprising a hollow body having a door opening in its front side and also having an open top, and a bottom formed with means for connection with the conduit, the upright wall of the body having a wire passage near its upper edge, the wire passage extending through the upper edge of said wall, and being substantially a slot open at its upper end, a support for an electrical appliance mounted within the body of the back thereof and movable through the opening in the front of the body, a cap lapping the upper edge of the body and extending across the open end of said slot, means for detachably securing the cap in position whereby the cap is readily removable for permitting access to the interior of the body, and a door for the door opening, substantially as and for the purpose described.

11. A conduit fitting comprising a rectangular hollow body having a flaring open top and also having its front side open, wire openings in the flaring portion, the openings opening through the upper edge of the body, a hood detachably mounted on the body and closing the open ends of the wire openings, an electrical appliance mounted within the body on the rear wall thereof and a door for the open side of the body, substantially as and for the purpose set forth.

In testimony whereof I affix my signature in presence of two witnesses.

SAMUEL B. VAN RANST.

Witnesses:
 M. E. ALLEN,
 C. C. SCHOENECK.